(12) United States Patent
Pow et al.

(10) Patent No.: US 8,490,579 B2
(45) Date of Patent: *Jul. 23, 2013

(54) ANIMAL SHELTER STRUCTURES

(75) Inventors: Thomas George Pow, Whangarei (NZ);
Kathleen Ann Pow, Whangarei (NZ)

(73) Assignee: Herd Homes Limited, Whangarei (NZ)

( * ) Notice: Subject to any disclaimer, the term of this patent is extended or adjusted under 35 U.S.C. 154(b) by 725 days.

This patent is subject to a terminal disclaimer.

(21) Appl. No.: 12/086,415

(22) PCT Filed: Dec. 14, 2006

(86) PCT No.: PCT/NZ2006/000324
§ 371 (c)(1),
(2), (4) Date: Sep. 21, 2009

(87) PCT Pub. No.: WO2007/069916
PCT Pub. Date: Jun. 21, 2007

(65) Prior Publication Data
US 2010/0012040 A1  Jan. 21, 2010

(30) Foreign Application Priority Data

Dec. 14, 2005  (NZ) .......................... 544190
Feb. 1, 2006  (NZ) .......................... 545042
Oct. 18, 2006  (NZ) .......................... 550635

(51) Int. Cl.
*A01K 1/00* (2006.01)
*A01K 1/01* (2006.01)
(52) U.S. Cl.
USPC .......................... 119/448; 119/14.03; 119/442

(58) Field of Classification Search
USPC ...... 119/14.03, 416, 436, 442–443, 447–448, 119/450–451, 527
See application file for complete search history.

(56) References Cited

U.S. PATENT DOCUMENTS

| | | | |
|---|---|---|---|
| 1,995,213 A | 3/1935 | Martin | |
| 2,889,763 A | 6/1959 | Pine | |
| 3,601,096 A | 8/1971 | Rutherford | |
| 3,677,229 A | 7/1972 | Blough | |
| 3,905,334 A | 9/1975 | Stevenson | |
| 3,919,976 A * | 11/1975 | Meyer et al. .................. | 119/447 |

(Continued)

FOREIGN PATENT DOCUMENTS

| | | |
|---|---|---|
| DE | 200 07 702 U1 | 1/2001 |
| FR | 2728063 | 6/1996 |

(Continued)

OTHER PUBLICATIONS

International Search Report dated May 7, 2007.

(Continued)

*Primary Examiner* — David Parsley
(74) *Attorney, Agent, or Firm* — Jacobson Holman PLLC

(57) ABSTRACT

An at least partially open sided outdoor animal shelter structure, the structure including (a) a floor to support animals, the floor including apertures therethrough allowing animal waste matter to pass through the floor, (b) a basement below the floor for collecting the waste matter, (c) floor supports to support the floor above the basement, (d) side supports, (e) a water impervious canopy supported by the side supports, the canopy being supported above at least part of the floor, the canopy allowing at least some light to pass therethrough, (f) at least one air flow controller to control airflow in the area below the canopy.

14 Claims, 8 Drawing Sheets

U.S. PATENT DOCUMENTS

| | | | |
|---|---|---|---|
| 3,938,428 A | 2/1976 | Van Huis | |
| 3,951,336 A | 4/1976 | Miller | |
| 4,043,256 A | 8/1977 | Van Huis | |
| 4,060,054 A * | 11/1977 | Blair | 119/447 |
| 4,208,279 A * | 6/1980 | Varani | 210/613 |
| 4,430,960 A * | 2/1984 | Nagel et al. | 119/439 |
| 4,776,385 A | 10/1988 | Dean | |
| 5,099,795 A * | 3/1992 | Nagel | 119/439 |
| 5,336,131 A | 8/1994 | Crider et al. | |
| 5,865,143 A * | 2/1999 | Moore, Jr. | 119/442 |
| 5,911,195 A | 6/1999 | Tripp | |
| 6,207,057 B1 | 3/2001 | White | |
| 6,276,304 B1 * | 8/2001 | Tai | 119/448 |
| 6,810,832 B2 * | 11/2004 | Ford | 119/437 |
| 7,810,453 B2 * | 10/2010 | Craft | 119/442 |
| 2002/0046712 A1* | 4/2002 | Tripp et al. | 119/450 |
| 2004/0121721 A1 | 6/2004 | Williams | |
| 2007/0006815 A1* | 1/2007 | Correa et al. | 119/443 |

FOREIGN PATENT DOCUMENTS

| | | |
|---|---|---|
| GB | 1 320 293 | 6/1972 |
| GB | 2136472 | 9/1984 |
| GB | 2172627 | 9/1986 |
| GB | 2210392 | 6/1989 |
| GB | 2248076 | 3/1992 |
| JP | 10-262479 | 10/1998 |
| WO | 86/07438 | 12/1986 |
| WO | WO 86/07438 | 12/1986 |
| WO | 93/19588 | 10/1993 |
| WO | WO 96/41520 | 12/1996 |
| WO | WO 00/00013 | 1/2000 |
| WO | 2004/022883 | 3/2004 |
| WO | WO 2004/022883 | 3/2004 |
| WO | WO 2005/033010 | 4/2005 |

OTHER PUBLICATIONS

New Zealand Patent Specification for NZ Patent Application No. 544190, received by the New Zealand Patent Office on Jun. 11, 2008.

* cited by examiner

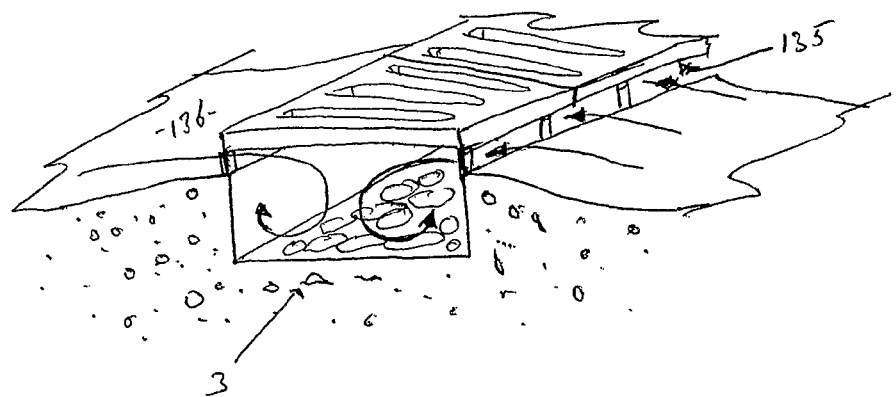
FIGURE 3a
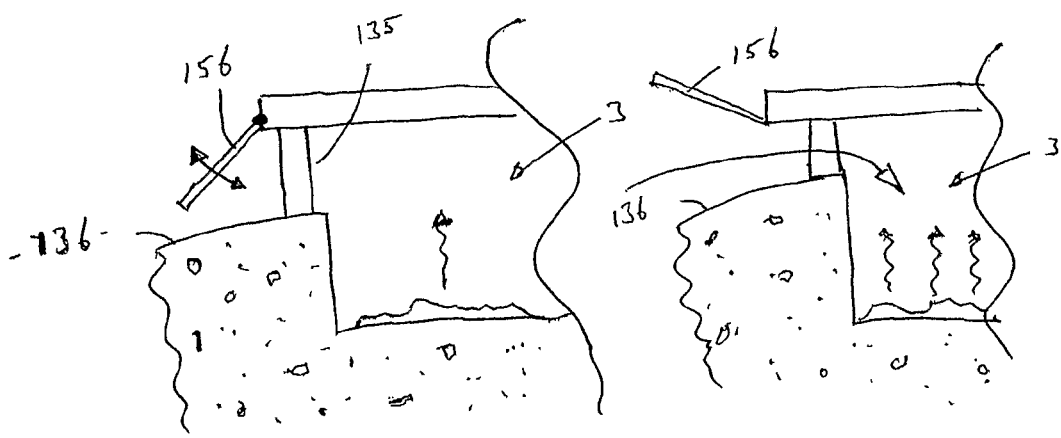
FIGURE 3b
FIGURE 3c

ANIMAL SHELTER STRUCTURES

This is a national phase of PCT/NZ2006/000324 filed Dec. 14, 2006 and published in English.

FIELD OF THE INVENTION

This invention relates to improvements in or relating to animal shelter structures, and in particular although not solely to shelter structures that include waste matter handling features.

The invention also relates to a method of conditioning or nurturing animals and related means and in particular although not solely to such methods and related means for conditioning milk producing animals.

The invention is applicable and/or adapted to suit the farming of livestock such as cattle, sheep, deer, goats, pigs, ostriches and the like.

BACKGROUND

Pugging and compaction damage of grazing pasture can occur by grazing animals, or farm vehicles and machinery. This can occur when the soil is soft such as when its wet and the weight of the animals or vehicles cannot be adequately supported by the soil's surface. Pugging can result in poor drainage, keeping the soil soft and wet. Pugging and compaction damage can also result in reduced pasture utilisation as well as a reduction in future pasture yield, depending upon the soil type. Pugging also allows weeds and poor species of grasses to become established. Moreover, pugging and compaction damage requires more tractor passes for seed bed preparation and sowing and greater fertiliser and topsoil requirements. However, it may not always be possible to add the necessary increased fertiliser requirement due to some region's/country's regulations regarding runoff of nitrogen into the waterways.

In order to address the problem of runoff, and/or pugging and/or compaction damage of grazing pastures, stand-off pads are often used. Stand-off pads are generally purpose-built, loafing or standing spaces where stock can be held for long periods when it is not suitable to have them on pasture. This may occur for example during a wet season, inclement weather, or when it is otherwise undesirable to have cattle or other livestock on pasture.

Some presently available stand-off pads are usually constructed of wood/wood chips, metal/lime, or concrete. One disadvantage associated with such stand-off pads is in relation to drainage. That is, many pads often have poor drainage or simply allow the effluent to be washed off and into oxidation ponds, or directly into waterways. It is now well known that effluent run-off into waterways is environmentally damaging.

Furthermore, it is found that there are usually problems associated with standing livestock such as cows on presently available concrete pads (predominantly lameness) and wood chip pads (predominantly mastitis). The effectiveness of wood chip pads is generally found to be dependent upon good management and regular maintenance, involving regularly stripping the old surface and replacing it with new wood chips. This can be both time and cost intensive.

WO2004/022883 addresses some of these issues regarding common stand-off pad constructions. WO2004/022883 describes a covered stand-off pad that includes a slatted concrete floor that allows for effluent to pass therethrough and into a basement area.

This allows waste matter to be separated from the floor and to be collected in the basement This has several advantages including that the floor does not need to be hosed down as excess waste matter tends not to build up on the floor.

Also, it has been found that upon contact with the air, a film or skin is formed over the waste material within the basement in much the same way as a skin forms quickly over a "cow pat". This skin or film serves to block odours and/or harmful gases emanating from the waste material from being released into the surroundings of the stand-off pad. The skin or film is believed to be a protein which forms upon contact with oxygen of components within the waste matter and while blocking gases and odours still allows the evaporation of moisture therethrough. As some of the constituents of waste matter can be useful as fertilizer, whereas liquid urine is not a desirable constituent due to environmental pollution problems, evaporation of liquid is desirable in order to allow a processing of the waste before it is used as a fertiliser. Whilst in use it has been found that above a certain combination of environmental conditions, primarily temperature and/or humidity and/or airflow within the basement area, sufficient evaporation in the basement area to actively reduce the volume of liquid in the waste matter may occur. A net reduction in liquid can hence result.

Whilst in-use it has been found that below a certain combination of environmental conditions, primarily temperature and/or humidity and airflow within the basement area, sufficient evaporation in the basement area to actively reduce the volume of liquid in the waste matter may not occur. A net gain in liquid can result The basement acts as a storage facility when this occurs. When for example the temperature increases during the warmer months of the year, evaporation from the waste matter within the basement area can start to occur. It has been found that the invention of WO2004/022883 can produce in the basement area, an environment with sufficient ambient air derived warmth and air flow (for example through the drainage means or through gaps between modular floor components) encourage evaporation of moisture from the stored waste material. Although it is desirable for such effects to occur even on less warmer days in order to increase processing rate of the waste matter.

Another feature of the invention described in WO2004/022883 is that the substantially waterproof cover, combined with the open side walls, serve to keep the floor as well as the basement relatively dry and ventilated. This is important given that it allows for dry waste matter to form on the slatted concrete floor of the standoff pad. This deposit or film serves as an insulator and/or softener between the hoof or foot of the animal and the concrete pad.

However, we have found that the invention described in WO2004/022883 does not always (or consistently) result in an effective drying and ventilation of the area enclosed by the standoff pad during all types of weather. For example, we discovered that there were portions of the shelter that were often in a wind shadow, or that were subjected to inconsistent wind flow, were therefore not subjected to any or significant or consistent drying or ventilating effect.

The invention of WO2004/022883 describes a roof that can help keep precipitation out and increase the temperature inside the structure for the purposes of aiding drying of waste matter on the floor and in the basement However during certain times of the day it may be undesirable for animals to be located under the roof. In particular certain animals are quite sensitive to environmental conditions. In particular body temperature and heat exchange factors can have an influence on for example milk productivity of animals. Prolonged stand-off periods during hot weather can adversely affect an animals productivity, particularly under a covered stand-off facility where air circulation may reduce heat exchange. Accordingly the invention described in WO2004/022883 has some further limitations.

It is therefore an object of the present invention to provide improvements in or relating to the animal shelter structures, which will go at least some way towards addressing the foregoing, or which will at least provide industry with a useful choice.

It is also an object of the present invention to provide a method of conditioning milk producing animals and related means.

Further aspects and advantages of the present invention will become apparent from the ensuing description which is given by way of example only.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

BRIEF DESCRIPTION OF THE INVENTION

In a first aspect the present invention consists in an at least partially open sided outdoor animal shelter structure, said structure including:

(a) a floor to support animals, said floor including apertures therethrough allowing animal waste matter to pass through the floor, (b) a basement below said floor for collecting said waste matter, (c) floor supports to support said floor above said basement, (d) side supports, (e) a water impervious canopy supported by said side supports, said canopy being supported above at least part of said floor, said canopy allowing at least some light to pass therethrough, (f) at least one air flow control means to control airflow in the area below said canopy.

Preferably said canopy is curved.

Preferably said airflow control means includes a louvre board that (a) is proximate said canopy to define a gap between said louvre board and said canopy, and (b) extends outwardly and downwardly along one or more sides of the structure, to direct airflow incoming to the area below the canopy along at least part of the underside of the canopy.

Preferably said air flow encouraging means includes at least one closable vent in the canopy.

Preferably said structure includes a retractable shade cloth that can be extended to be positioned above at least part of the floor and below said canopy to shade at least part of the floor from sunlight entering the structure.

Preferably said structure includes a removable shade cloth that can be positioned above at least part of the floor and below said canopy to shade at least part of the floor from sunlight entering the structure.

In a further aspect the present invention consists in a method of cooling air in an outdoor, at least partially open sided, animal shelter structure of a kind that includes a floor for animals to stand on and above which is supported a light transmissive canopy and wherein a closable vent is provided in the canopy and wherein a retractable shade cloth is provided that can extend above at least part of the floor and below the canopy, said method including the steps of:

(a) opening the vent, and (b) extending the shade cloth to shade at least part of the floor from ambient light entering through the canopy.

In a further aspect the present invention consists in a method of heating air in an outdoor, at least partially open sided, animal shelter structure of a kind that includes a floor for animals to stand on and above which is supported a light transmissive canopy and wherein a closable vent is provided in the canopy and wherein a retractable shade cloth is provided that extends above at least part of the floor and below the canopy, said method including the steps of:

(a) closing the vent, and (b) retracting the shade cloth to expose more of the floor to ambient light entering through the canopy.

In a further aspect the present invention consists in an outdoor animal shelter structure comprising a. a floor to support animals b. a canopy, supported above said floor, for animals to stand under, said canopy able to provide at least partial shading from ambient sunlight and cover from precipitation for at least part of said floor, wherein the space between the floor and the canopy is along at least part of one side of the structure open to ambient atmospheric conditions, and c. air flow control means to control airflow in the space between the canopy and the floor, said airflow control means selected from at least one i. a louvre board located adjacent at least one edge of the canopy yet separated therefrom to define a gap between the canopy and the louvre board, said louvre board oriented to direct part of any appropriately directed ambient airflow incident on the structure, through said gap and along at least part of the underside of said canopy to encourage a circulation of air in said space, and ii. a closable opening through said canopy that, in its open condition, can allow airflow out of the space, through said canopy.

Preferably the structure is four sided in plan shape and at least two of the sides are at least partially open to ambient atmospheric conditions and wherein a said louvre board is provided at or near each of said open sides.

Preferably the canopy is varied in height above said floor wherein the lower most parts of the canopy are disposed proximate said two opposed sides of said structure and at least one apex of the canopy is positioned intermediate thereof.

Preferably the canopy extends upwardly from each of said two opposed sides toward the apex.

Preferably the louvre board projects away from said space in a downward direction in order to encourage said ambient airflow to enter said space in an upward direction.

Preferably said canopy is uni-directionally curved and defines an elongate apex extending intermediate of two opposed sides of said structure.

Preferably said closable opening is positioned along at least part of the apex of said canopy.

Preferably the closable opening is closable by a panel that is pivotally supported to move relative said canopy between a position closing said opening and a position to allow airflow through said opening.

Preferably the floor is supported above a basement and wherein the floor includes a plurality of apertures to allow waste matter to drop through the floor and into the basement.

Preferably the floor is elevated above at least some ground adjacent to where the structure is positioned to define an opening via which part of any appropriately directed ambient airflow incident on the structure to pass into the basement.

Preferably at at least one side of the structure the basement includes an opening directly exposed to ambient atmospheric conditions to allow part of any appropriately directed ambient airflow to enter the basement.

Preferably an airflow control means is provided to alter airflow through said opening to said basement.

Preferably said airflow control means is a movable baffle.

Preferably said baffle can be positioned to scoop airflow towards said opening.

Preferably said baffle can be positioned to constrict airflow through said opening.

In a further aspect the present invention consists in an outdoor animal shelter structure comprising
a. a floor to support animals, said floor including a plurality of apertures therethrough,
b. a canopy, supported above said floor, for animals to stand under, said canopy able to provide at least partial shading from ambient sunlight and cover from precipitation to at least part of said floor,
c. a basement below the floor to collect waste matter that may fall through the apertures of the floor, wherein at at least one side of the structure the basement includes an opening directly exposed to ambient atmospheric conditions to allow part of any appropriately directed ambient airflow to enter the basement.

Preferably an airflow control means is provided to alter airflow through said opening to said basement.

Preferably said airflow control means is a movable baffle.

Preferably said baffle can be positioned to scoop airflow towards said opening.

Preferably said baffle can be positioned to constrict airflow through said opening.

In a further aspect the present invention consists in an outdoor animal shelter structure comprising
a. a floor to support animals
b. a canopy, supported above said floor, for animals to stand under, said canopy able to provide at least partial shading from ambient sunlight and cover from precipitation to at least part of said floor, wherein the space between the floor and the canopy is along at least part of one side of the structure open to ambient atmospheric conditions and
c. a louvre board located adjacent at least one edge of the canopy yet separated therefrom to define a gap between the canopy and the louvre board, said louvre board oriented to direct part of any appropriately directed ambient airflow incident on said structure through said gap and upwardly into said space to enhance circulation of air inside said space.

In a further aspect the present invention consists in an outdoor animal shelter structure comprising
a. a floor to support animals
b. a canopy supported above said floor, for animals to stand under, said canopy able to provide at least partial shading from ambient sunlight and cover from precipitation to at least part of said floor, wherein the space between the floor and the canopy is along at least part of one side of the structure open to ambient atmospheric conditions, and
c. a closable opening through said canopy that in its open condition can allow airflow out of the space, through said canopy.

Preferably the canopy is at least in part, translucent so that at least some ambient sunlight can pass into the space.

Preferably louvre boards may be situated below the lower edges of the canopy of the structure.

Preferably the louvre boards may preferably be provided on opposing sides of the structure (in the case of a square or rectangular structure). Furthermore, for a rectangular-type structure the louvre boards may preferably extend along opposing longitudinal or longer sides of the structure.

Preferably the louvre board may preferably (although not exclusively) be angled at approximately 20 degrees-70 degrees with respect to the side support means for the structure.

Preferably (although not exclusively) the louvre boards may be situated approximately 100 mm-1000 mm below the tops of the side supports.

Preferably (although not exclusively) the louvre boards may be approximately 300 mm-1500 mm in length (measured from the side supports to the tips of the louvre boards).

Preferably the louvre boards serve to deflect and encourage/enhance airflow passing between the lower edges of the canopy and the louvre boards. As a result, we have found that the presence of the louvre boards greatly increases the efficiency of airflow through and within the structure, with desirable effect.

Preferably when the structure has a closed and curved canopy and no shade material, we have found that an enhanced airflow passes between the louvre boards and the lower edges of the canopy. This airflow will initially rise or be deflected upwards by the louvre boards, before being deflected downwards (by the canopy and/or opposing airflows), in a spiralling motion—which thoroughly heats and/or dries and/or ventilates the area enclosed by the structure. At the same time, air may also be drawn into the structure through the open sides of same—which airflow is enhanced by the spiralling effect just described. This is particularly effective during cold weather and results in an efficient heating and/or drying and/or ventilating effect.

Preferably for a vented canopy structure some airflow can passes out through the canopy vent. In such an embodiment, the deflected or enhanced airflow entering the structure above the louvre boards and below the edges of the canopy also encourages an enhanced airflow through the open sides of the structure. This is particularly effective during hot/sunny weather and results in an efficient cooling and/or ventilating effect.

Preferably a retractable and/or removable shade material which, when in use, extends across the inside of the structure may be used.

Preferably the shade material may be of a size and dimension that is substantially the same as the floor.

Preferably the shade material may be any known variety of shade cloth presently available, namely, that which provides shade, yet also has apertures in it such that air can flow through.

Preferably the shade material may be retractable across the inside of the structure, preferably at the level of the top of the side support means. Any suitable retraction means may be utilised, for example a roller-blind type arrangement.

Alternatively, the shade material may be removable. In such an embodiment the shade material may, for example, be supported by hooks and eyes extending at intervals along the sides of the shade material and the insides of the side support means of the structure respectively.

Preferably the louvre board are able to be moved in position to close the airgap between the board's and the canopy.

Preferably the airgap between the louvre boards and the canopy can be closed.

In a further aspect the present invention consists in a milking complex comprising;

a milking shed at where cows are to be milked, said milking shed including at least one opening via which cows can enter and leave the milking shed, and a separate shelter structure positioned adjacent the milking shed for cows to stand, immediately prior to entering the milking shed.

Preferably the shelter structure is located more than 45 meters away from the milking shed.

Preferably the shelter structure is located no more than 100 meters away from the milking shed.

Preferably the shelter structure includes an entrance via which cows can enter the shelter structure and an exit via which cows can leave the shelter structure, the exit being proximate more the milking shed than the entry.

Preferably a passage way is defined between the at least one opening of the milking shed and the exit of the shelter structure to guide cows from the shelter structure to the milking shed.

Preferably the passage way is covered to provide shade from sunlight and cover from precipitation to cows in the passage way.

Preferably the shelter structure is substantially rectangular in plan shape and the entry is provided at one end of the shelter and the exit is provided at the opposite end of the shelter.

Preferably the exit of the shelter is no more than 100 meters way from the milking shed.

Preferably the shelter structure comprising
  a. a floor to support animals, said floor including a plurality of apertures therethrough,
  b. a canopy, supported above said floor, for animals to stand under, said canopy able to provide at least partial shading from ambient sunlight and covet from precipitation to at least part of said floor.

Preferably the shelter structure includes a basement below the floor to collect waste matter that may fall through the apertures of the floor.

Preferably at at least one side of the structure the basement there is an opening directly exposed to ambient atmospheric conditions to allow part of any appropriately directed ambient airflow to enter the basement.

Preferably the complex includes a run-off collection reservoir positioned adjacent the shelter structure to collect run-off of excess waste matter collected in the basement of the shelter structure.

Preferably at least part of the basement slopes in a manner to encourage run-off of excess waste matter by gravity towards the reservoir.

Preferably pipes may be provided to facilitate run-off.

Preferably the space between the floor and the canopy is along at least part of one side of the structure open to ambient atmospheric conditions and wherein a louvre board is located adjacent at least one edge of the canopy yet separated therefrom to define a gap between the canopy and the louvre board, said louvre board oriented to direct part of any appropriately directed ambient airflow incident on said structure through said gap and upwardly into said space to enhance circulation of air inside said space.

Preferably the space between the floor and the canopy is along at least part of one side of the structure open to ambient atmospheric conditions, and wherein a closable opening through said canopy that in its open condition can allow airflow out of the space, through said canopy.

In a further aspect the present invention consists in a milking complex as hereinbefore described wherein the shelter structure is one as hereinbefore described.

In a further aspect the present invention consists in a method of a conditioning dairy animal prior to it being milked, to encourage its condition towards a homeostatic physiological state to improve milk yield (whether milk quality or quantity or both), the method including moving the dairy animal into a shelter structure that is configured to create an environment for the dairy animal to remain in for a duration prior to milking, that will tend the condition of the dairy animal towards the desired homeo-static physiological state.

Preferably that includes keeping the dairy animal in the shelter structure for at least 10 minutes before advancing the dairy animal from the shelter to a location for their milking.

In a further aspect the present invention consists in a method as hereinbefore described wherein the shelter structure is one as hereinbefore described.

Preferably the shelter structure includes environment sensors that allow at least one environment measurement to be taken and used for recordal and/or processing and/or feedback control for structure configuration.

In a further aspect the present invention consists in a method of conditioning cows prior to their being milked to encourage them to an optimal homeostatic physiological condition for milk productivity and/or milk quality, the method including moving cows from a location where they are subjected to environmental conditions that can have an adverse effect on the physiological condition of the cows, into a shelter structure, the structure configured to create an environment for the cows to remain in for a duration prior to milking that will tend the cows towards the optimal homeostatic physiological condition.

In a further aspect the present invention consists in a method of preconditioning a dairy animal to a condition at or near a state to improve milk yield, said method involving standing the animal for a period of time in a shelter structure of a kind as hereinbefore described and that is configured to establish an environment in said covered space to encourage the animal towards said state.

In a further aspect the present invention consists in an outdoor animal shelter structure comprising
  a. a floor to support animals,
  b. a canopy, supported above said floor, for animals to stand under, said canopy able to provide at least partial shading from ambient sunlight and cover from precipitation to at least part of said floor
  c. a horizontally extending shade cloth positioned intermediate of said canopy and said floor and under which said animals can stand to provide at least a partial barrier to exchange of air between the space above and below the shade cloth and/or passing of sunlight to below said shade cloth.

In a further aspect the present invention consists in an outdoor animal shelter structure positioned to be subjected to ambient environmental conditions and that can provide an environment for the conditioning of animals and for storage and dehydration of their effluent, said structure comprising
  a. a floor to support animals, said floor including a plurality of apertures therethrough,
  b. a canopy, supported above said floor, for animals to stand under, said canopy able to provide at least partial shading from ambient sunlight and cover from precipitation to at least part of said floor, wherein the space between the floor and the canopy is along at least part of one side of the structure open to ambient atmospheric conditions and c. a basement below the floor to collect effluent that may fall through the apertures of the floor, d. means to change the air condition inside the space the means capable of modifying the manner in which the structure interacts with said ambient environmental conditions.

In a further aspect the present invention consists in a method of conditioning a lactating ruminant, which method comprises or includes the step(s), prior to location of the ruminant in a milking bail, of causing or allowing the ruminant to assimilate to condition(s) in a structure conducive to a desired homeostatic physiological state and/or its being milked.

In a further aspect the present invention consists in an animal shelter as hereinbefore described and as herein before described and with reference to the accompanying drawings.

In a further aspect the present invention consists in an animal shelter as hereinbefore described and as described and with reference to the accompanying drawings.

This invention may also be said broadly to consist in the parts, elements and features referred to or indicated in the specification of the application, individually or collectively, and any or all combinations of any two or more of said parts, elements or features, and where specific integers ate mentioned herein which have known equivalents in the art to which this invention relates, such known equivalents are deemed to be incorporated herein as if individually set forth.

BRIEF DESCRIPTION OF THE DRAWINGS

Further aspects of the present invention will become apparent from the following description which is given by way of example only and with reference to the accompanying drawings, in which:

FIG. 3a is a partial perspective cross sectional view of the floor and basement regions of a shelter wherein the floor is elevated above at least some of the adjacent ground to allow an airflow passage to be defined for airflow into and/or out of the basement, FIG. 3b is a partial sectional view of the basement and floor wherein a louvre board is provided to control airflow in the basement and/or to offer shelter from precipitation driving into the basement, FIG. 3c is a partial sectional view of the basement as shown in FIG. 3b wherein the louvre board is in a different position.

DETAILED DESCRIPTION OF THE INVENTION

The terms "waste matter" is understood to include cattle or livestock effluent such as faeces and urine, as well as other waste such as food waste and the like.

Figure 1:
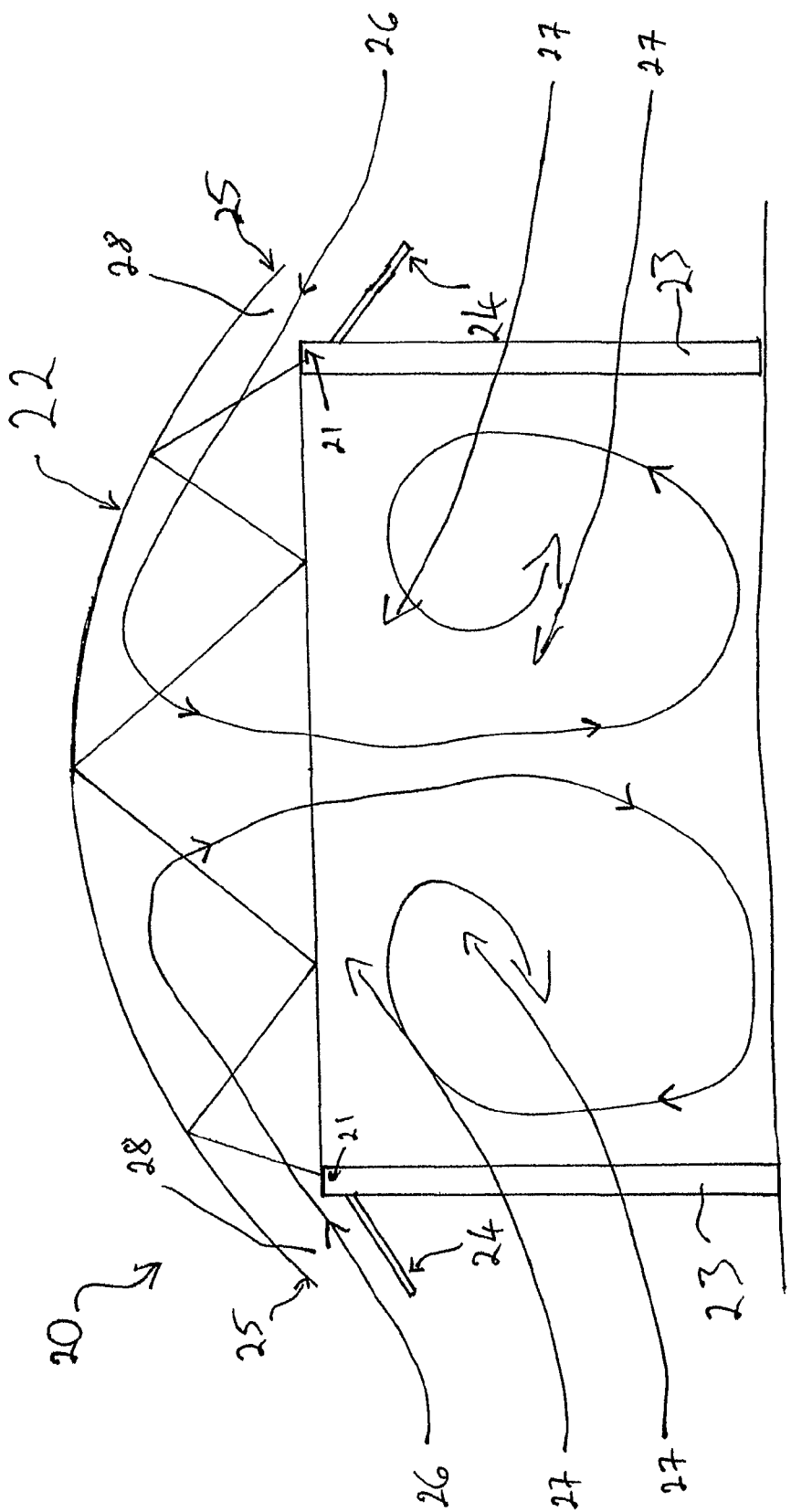
FIG. 1 is an end view of an animal shelter structure that includes a canopy above a ventilated covered space.

In FIG. 1, there is shown a shelter structure 20. The structure 20 is preferably a four side structure that includes a canopy 22 covering a covered space. The structure is preferably is an open sided structure having at least one and preferably all of its four sides at least partially open. The structure 20 preferably has a curved and closed canopy 22, supported by and above side supports 23 such as posts or props.

The structure is provided with louvre boards 24 that are provided to assist in modifying the environment within the covered space. The louvre boards are preferably provided along at least two opposed sides of the structure. There is at least one louvre board at each side although a plurality of louvre boards positioned end on end may be provided. A louvre board 24 may extend along at least two opposing or all sides of the structure 20. Where the structure 20 is rectangular in plan shape the louvre boards are preferably located at the major opposing sides. The louvre boards 24 are preferably situated below the lower edges 25 of the canopy 22. There is thus an airspace, generally indicated by arrows 28 between the louvre boards 24 and the lower edges 25 of the roof 22.

The louvre boards are preferably downwardly and outwardly extending from the lower edge 25 of the canopy 22. They are preferably angled at approximately 45 degrees with respect to the side supports 23 and extend generally the length of the sides of the structure 1. One or more louvre boards end on end may be used. One or more at least partially overlapping louvre boards may also be used.

The louvre boards 24 may measure approximately 750 mm from the side supports 23 to their tips. Furthermore, the louvre boards 24 may be joined to the side supports 23 approximately 300 mm below the tops 21 of the side supports 23.

The louvre boards 24 deflect and/or scoop and thereby encourage or enhance airflow passing through the gaps 28 into the covered space.

Airflow passing into the covered space through each of the gaps 28 is initially deflected upwards by the louvre boards 24 into the upper zones of the covered space. The airflow is then deflected downwards by the canopy and/or the opposing airflow entering from the other side of the covered space 20. This results in a generally downward displacement of air such as in a spiralling motion as indicated by the arrows 26. We have found that this downward spiralling motion of the airflow 10 only occurs effectively when the canopy 22 is non-flat, preferably pitched and most preferably curved with its apex midway between opposed side walls at where the louvre boards are provided.

Air may simultaneously also be drawn into the covered space through the open sides of same as indicated by arrows 27. Smoke tests have shown that this airflow 27 is enhanced by the spiralling motion of the airflow 26. Airflow entering the structure through the sides is indicated generally by arrows 27.

The end result is that the louvre boards can enhance environmental conditions within the covered space. Such enhancement may be to increase air circulation within the covered space to improve drying and/or evaporation of waste matter. The increased air circulation can also improve air displacement rates through the covered space to displace evaporated waste to the surrounding environment Enhanced environmental conditions resultant from the louvre boards may also be established to aid in a cooling of animals that may be inside covered space. This may be desirable on hot days and where the temperature inside the enclosed space would otherwise be much higher than the ambient temperature.

The louvre boards may be adjustable in their position to control the nature of the airflow through the airspace 28. They may be adjusted by pivoting at the inner edge of the louvre boards. They may be adjusted to an extent to close the airspace so that their effect on the airflow within the covered space is nil or minimal.

Figure 2:
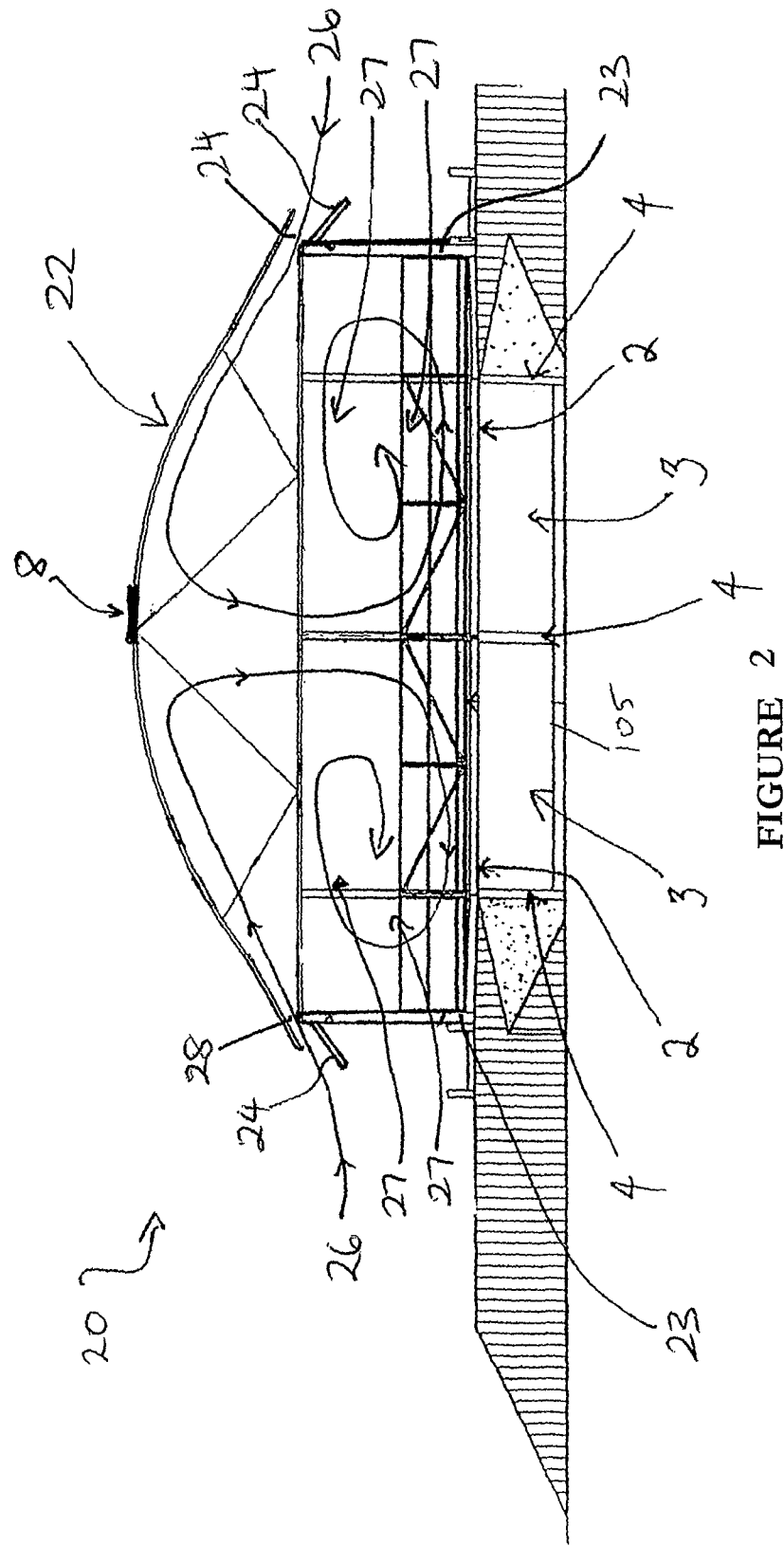
FIG. 2 is an end view of an animal shelter structure showing further aspects that including venting and environment control features.
Figure 2A:
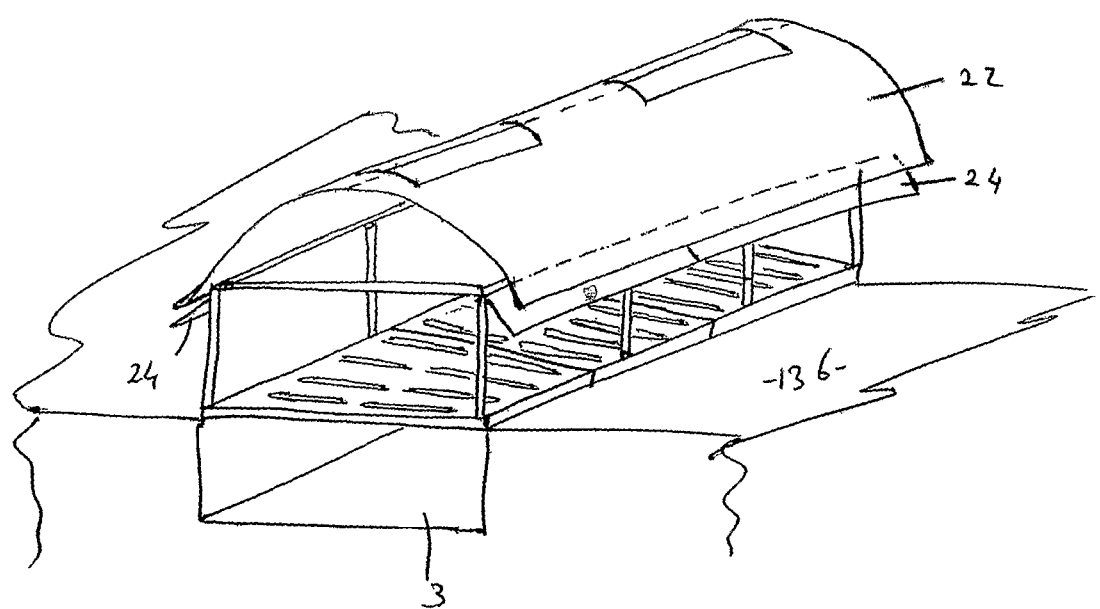
FIG. 2a is a partial perspective cross sectional view of some aspect shown in FIG. 2.

With reference to FIG. 2, there is shown more features of a structure 20.

Some such features of the structure are described in detail in WO2004/022883 and so for convenience only will not be described in great detail herein. WO2004/022883 is hereby incorporated by way of reference.

The structure 20 includes a floor 2. The floor 2 is a slatted floor to allow animal waste matter to pass therethrough. The structure 20 also includes a basement 3 below the floor 2 for collecting waste matter. The basement 3 may include a floor 105 and walls/props 4 for supporting the floor 2 above the basement 3.

Side supports 23 preferably in the form of posts are provided for supporting the canopy 22 above the floor 2. There are preferably no side walls to the structure.

The canopy 22 preferably includes a support structure and a translucent plastics cladding material The cladding material is waterproof and preferably allows light to pass therethrough. The passing through of light can contribute to establishing a desirable environment within the covered space.

The canopy 22 may be provided with a closable vent 8. In the embodiment shown in FIG. 2 this is closed.

Figure 3:
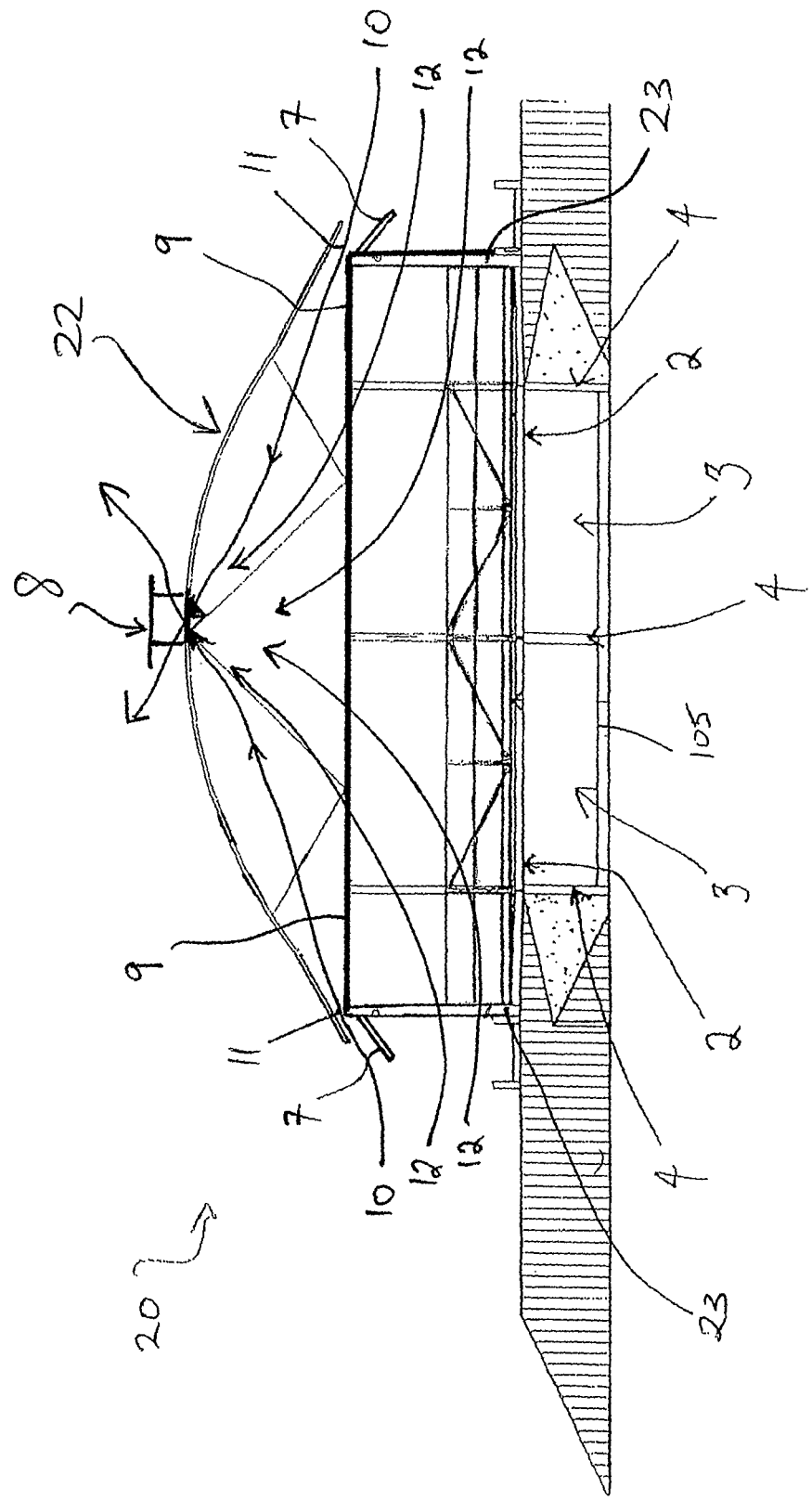
FIG. 3 is an end view of the embodiment shown in FIG. 2 showing the canopy venting feature in a position to allow a venting of air from the covered space.
Figure 3D:
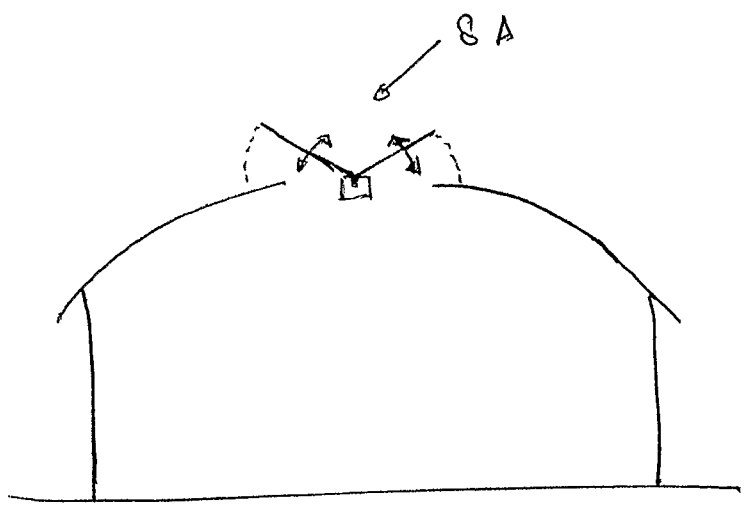
FIG. 3d is an end view a structure showing a canopy venting feature in an open condition.

Controlling the position of the vent 8 can allow for the environment below the canopy to be controlled. With respect to FIG. 3 for example, the vent 8 is open to allow airflow out of the covered space through the open vent 8. This can have an effect on the evaporation rate of waste matter. A vent of a different configuration is shown in FIG. 3*d*. Here the vent 8A may consist of two panels that are each independently controllable for movement between their closed and an open position Depending on the wind direction, this may allow a venturi effect to be established aiding in the venting of air from the enclosed space out through the vent 8A. The vent 8A may also be configured to scoop air into the covered space.

The structure may also include a shade cloth or barrier sheet 9 that may be positioned to across at least part of the covered space.

The shade cloth 9 may be of a material that serves to provide shade from light passing through the canopy. For example during sunny weather and when animals are standing on the floor 2, shading may be desirable in order to keep the temperature of the shaded area at desired levels. The shade cloth 9 may also serve to act as a barrier for heat in the upper regions of the enclosed space above the cloth to remain separated from the area below the cloth.

On hot days that are not sunny and when heating of the covered space due to direct sunlight is not an issue, the shade cloth 9 may be removed to enhance the airflow entering the covered space 1, particularly through the sides.

The shade cloth may be mounted on a spool to allow it to be extended and retracted.

The canopy is preferably translucent enough to allow part of the ambient light to enter the covered space. This can allow for a heating of the space below the canopy to occur for the purposes of dehydration and/or heating of animals. One of the purposes of the shade cloth is to reduce heating of animals if ambient light coming through the translucent canopy would otherwise cause over heating of the animals.

The shade cloth is preferably a shade providing material. This may be in the form of a translucent material or a material that has many small apertures therethrough.

The shade providing characteristics of the shade cloth and/or the canopy may provide a full block to sunlight or at least a partial block.

Figure 4A:
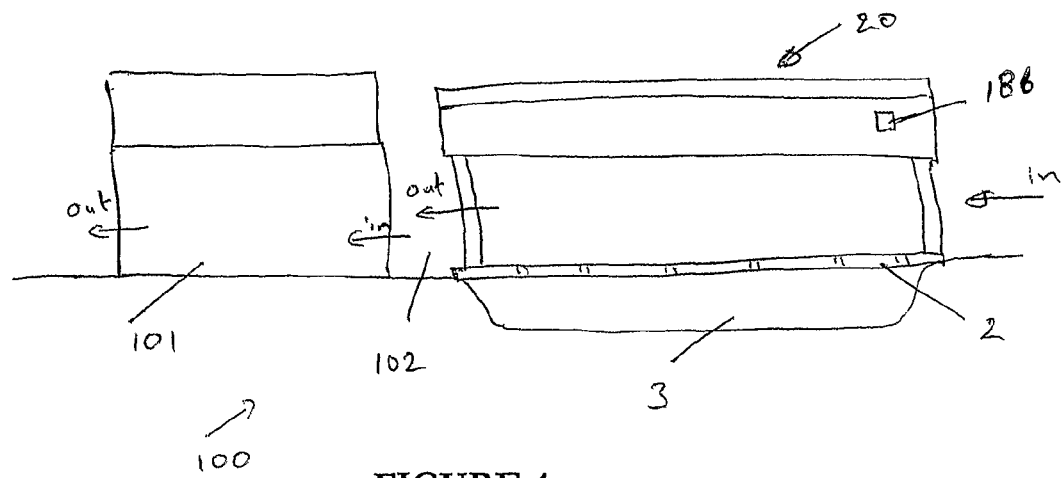
FIG. 4a is a side and partial cross sectional view of a milking complex including an animal shelter and a milking shed showing their relative disposition in side view.

With reference to FIG. 4*a*, there is shown a milking complex that may include a shelter structure 20 as described with reference to FIGS. 1-3. The structure 20 is incorporated as part of a milking complex 100 that includes a milking shed 101. The milking shed 101 and the structure 20 are positioned proximate each other so as to allow for animals to be conditioned prior to their being milked. On for example a hot summer's day an animal can be cooled within the structure 20 to allow for the animals physiological condition to tend towards a condition that is optimal for milk productivity and milk quality. The shelter 20 is preferably positioned proximate the milking shed 101 so that advancement of animals from the shelter structure 20 into the milking shed 101 does not subject, to a significant extent, the animal to atmospheric conditions which will tend for their physiological condition to move away from the optimal. Accordingly animals can be conditioned within the shelter 20 and immediately advanced to the milking shed 101 for milking. Conditioning may for example include raising the temperature of the animal from the temperature that they were at during grazing on pasture, when for example the ambient climate has the effect of cooling. This may be as a result of the structure offering shelter from precipitation and/or reducing wind-chill effects and/or providing a space that has a higher temperature to the ambient temperature. Conditioning may also include ensuring that the humidity in the covered space tends the animal's physiological condition toward a desired state.

A passage may be provided between the structure 20 and the milking shed 101 to guide the animals from the structure 20 to the milking shed 101. The passage may be covered or may be uncovered. A coveted passage will provide shade to the animals from the elements adverse to the conditioning of the animals. (be it precipitation or sun).

The animals may enter the structure 20 at one end of the structure and may leave the structure 20 at an opposite end. At the opposite end, the animals are guided via the passage 102 to the milking shed 101. Preferably the milking shed 101 and the structure 20 stand independent of each other. Preferably the structure 20 is no closer than 45 metres away from the milking shed 101.

Standalone structures defining the structure 20 and the milking shed 101 may be requited in situations where hygiene and health requirements prescribe such a situation. This can assist in avoiding cross contamination.

Figure 4B:
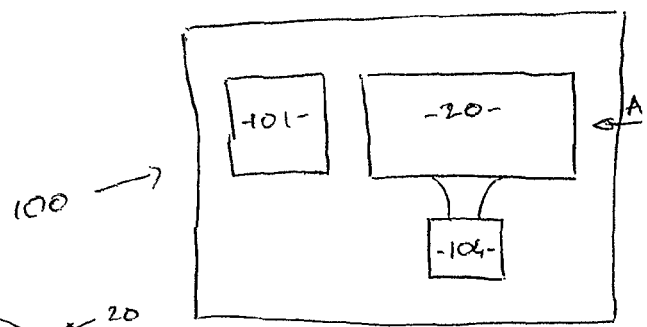
FIG. 4b is a plan view of the milking complex showing the shelter structure and milking shed.

With reference to FIG. 4*b* there is shown a plan view of the complex 100. Preferably a reservoir 104 is also provided as part of the complex 100. The reservoir 104 is provided adjacent the structure 20 where the structure 20 includes an elevated floor 2 above the basement 3. It is envisaged that the milking complex 100 need not necessarily have such an elevated floor 2 but this is preferred to allow for both conditioning of animals to occur prior to milking as well as dealing with animal waste simultaneously. The elevated floor 2 allows for effluent to pass into the basement 3. Solids will settle on the floor of the basement 3 whereas liquids will sit on top of the solids. Excess liquids that are not captured, evaporated or otherwise absorbed by the solids, are preferably dealt with by their run-off to the reservoir 104. Such runoff preferably occurs naturally by gravity. This may be by natural drainage or by the effect of hydraulic pressure.

Figure 4C:
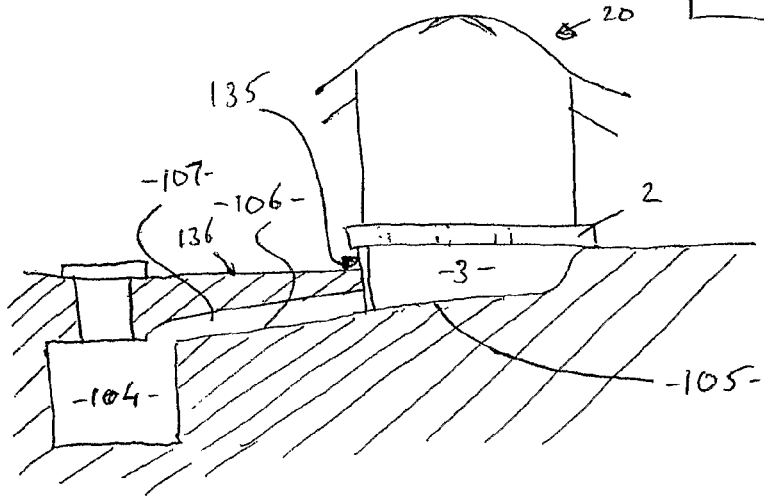
FIG. 4c is a view from direction A of FIG. 4b in partial cross section showing the shelter structure and collection reservoir.

To aid run-off, the basement 3 may include a support surface or surfaces that are of a sloping nature to allow for a runoff of excess liquid to occur for displacement to the reservoir. As can be seen with reference to FIG. 4c, the basement includes a floor 105 that is sloping and allows for a channelling or guidance of liquid effluent to the reservoir 104 preferably via a sloping surface 106 that it may be part of a conduit 107 extending between the basement 3 and the reservoir 104.

Figure 4D:
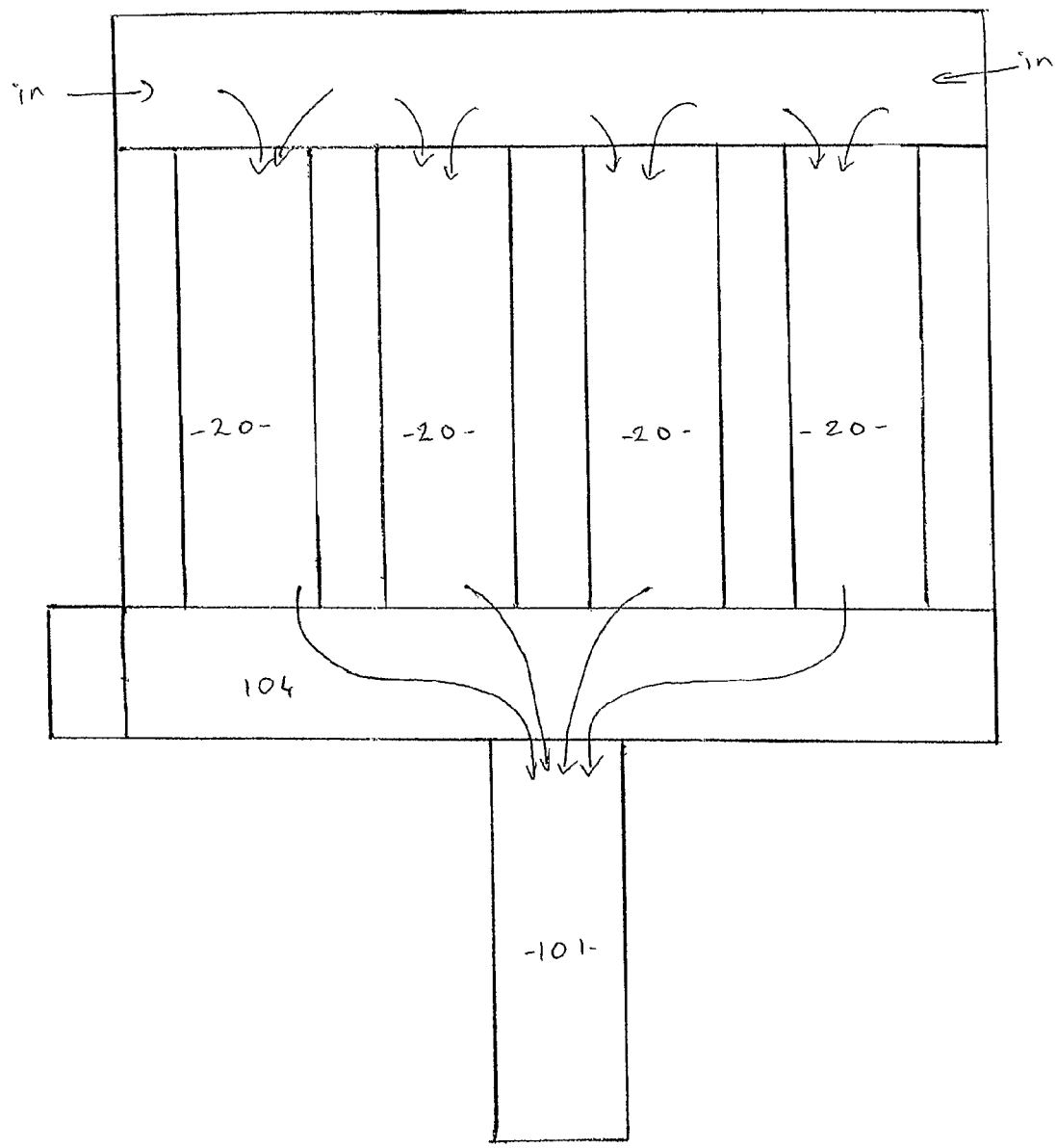
FIG. 4d is a plan view of a milking complex wherein a plurality of shelter structures are provided and one collection reservoir for at least some of the waste matter received in the basements of each shelter.

The complex shown in plan view in FIG. 4d is an example of a complex where multiple shelter structures are provided, located adjacent a milking shed and wherein one reservoir may be provided below a walkway between the structures 20 and the milking shed 101.

The structure 20, whether forming part of the complex 100 or otherwise, may include at least one environment sensor 186. This is for example shown in FIG. 4a. The environment sensor 186 may measure temperature and/or humidity and/or airflow. This sensor may allow for such data to be collected for recordal and analysis purposes. Also the data may be used for further processing including for allowing the environment control features such as the louvre boards and vent to be automatically adjusted to modify the condition of the structure 20. This can allow for automated control of environmental conditions within the shelter to occur. On a hot day the sensor 186 may control components of the shelter to effect a cooling of at least some of the coveted space when the is desired. On a cold day the controller may effect a reconfiguration of the shelter to result in a heating of the at least some of the covered space when that is desired. On a day with little wind the controller may effect a change in the configuration of the structure to increase air circulation and/or ventilation.

Preferably the floor 2 is itself elevated above surrounding ground 136 to allow for air to pass between the surrounding ground and the floor. This can allow for air to enter into the basement 3. For example with reference to FIGS. 3 *a,b,c* and 4c, it can be seen that a gap 135 exists between the floor 2 and the surrounding ground 136 to allow for air to enter into the basement 3. Air may be encouraged into this basement 3 by the use of louver boards 156. These may be fixed or movable. As shown in FIGS. 3b and 3c these boards 156 can pivot to allow their position to be adjusted. This can allow a certain degree of control of air flow in the basement 3 to occur. Air passing into the basement 3 may be desirable for the purposes of dehydrating the waste matter. Elevation of the floor 2 for such purposes may be to induce an airflow into the basement area 3 from one side of the structure or from one or more sides of the structure. The louvre boards may also be positioned to block airflow from entering the basement This may be desirable to prevent driving precipitation from being collected in the basement.

The louvre boards 156, if provided, may also be controlled appropriately to prevent air from blowing up through the apertures of the floor 2 as this may adversely affect the environmental conditions of the covered space between the floor and the canopy. Such control may hence occur dependent on whether animals ate in or are about to enter into the structure 20 in order to establish the desired environment conditions for the animals. At times where no animals are under the canopy, environment conditioning by the control of any one or more of the appropriate environment affecting features can be such as to encourage a processing of the waste matter, rather than conditioning of animals.

A sensor 186 may be provided in the shelter that may be used to detect the presence of animals to allow for the shelter structure to be configured between a configuration benefiting processing of waste and a configuration benefiting conditioning of the animals. The sensor 186 may operate in conjunction with other controls and/or sensors and/or be pre-programmed to take account of factors such as for example regular milking times during the day where advanced conditioning of the shelter can occur prior to animals arriving.

As can be understood from the foregoing description, the structure 20 can provide efficient and effective environment control for should ambient conditions not suffice or are unable to induce an appropriate environment (such as during cold and hot weather) and for at least one of two purposes, namely to condition animals and aid in dehydration of waste matter. For example, during hot weather, the vent 8 and/or the louvre boards 24 and/or louvre boards 156 can encourage a cooling and/or shading and/or ventilating effect of at least some of the covered space. Similarly, during cold weather, the heating and/or drying and/or ventilating can be encouraged.

In use, the various environment control features may be utilised to shade and/or cool and/or ventilate the interior of a structure (for example during hot or sunny weather) as follows:
  (a) The vent in the canopy may be opened, and the shade material (optionally) may be extended across the inside.
  (b) With such an arrangement, airflow is enhanced between the louvre boards and the lower edges of the canopy (as previously described). This (warm) airflow is ultimately deflected or drawn out through the vent in the canopy.
  (c) Moreover, the enhanced airflow between the louvre boards and the lower edges of the canopy also enhances, or draws through, airflow through the open sides of the structure.
  (d) At the same time, the shade material, if utilised, may serve to provide shade within the structure.
  (e) At the same time, the shade material if utilised, may serve to provide further climate control within the structure.

This configuration can result in a effective shading and/or cooling and/or ventilating effect within the interior of the structure, thus improving the welfare of animals that are within the farm structure, for example during hot or sunny weather. Indeed, we have found during trials that animals are in fact drawn to the structure (with the ventilation means arranged as described) during hot and/or sunny weather.

In a further condition the environment control features may be utilised to heat and/or dry and/or ventilate the interior of the farm structure as follows:
  a. The closable vent in the canopy of the structure may be closed, and (if applicable) the shade material retracted or removed.
  b. In such an condition the enhanced airflow passing between the louvre boards and the lower edges of the canopy will again be deflected upwards by the louvre panels, before being deflected downwards (by virtue of the nature of the curved roof and/or opposing airflows) in a spiralling motion Smoke tests have shown that this spiralling effect covers most areas of the interior of the structure above the floor, thus leaving no or little wind shadows within the structure.
  c. At the same time, air may also be drawn into the structure through the open sides. This airflow is enhanced by the presence of the louvre board and resultant spiralling effect just described.

This configuration is particularly effective during cold weather and results in an efficient heating and/or drying and/ or ventilating effect.

The preferred curved canopy means that air entering the covered space through the sides is immediately diffused thereby reducing its velocity and reducing its direct heat transfer effect on animals in the enclosure yet still facilitating air circulation in the structure. The overall effect is that the interior of the structure can thoroughly heated and/or dried and/or ventilated—thus maximising the welfare of animals within the farm structure, for example during cold or inclement weather. Indeed, we have found during trials that animals are in fact drawn to the structure (with the ventilations means arranged as described) during cold or otherwise inclement weather.

One result may be that with improved and even coverage of airflow in the covered space, particularly during cold weather, the deposits of animal waste remaining on top of the floor can dry thoroughly. This can serves as an effective insulator or softener between the hoof or foot of the animals and the concrete floor 2. Hence animal welfare may be improved.

One result may also be that animals have access to a facility that may provide shelter and comfort from all types of weather all year round. This can lead to an improvement in animal welfare that may ultimately results in greater production from the animals.

The shelter allows a prolonged period of "standing off" for animals. It provides a covered area in which a herd can relax, be fed and lie down. The herd can use the shelter day after day with little labour inputs and allows farmers to maximise the farms ability to grow grass: not just when pugging is likely but also when it is advantageous for other reason to look after pasture. In summer the cows can loaf in a shelter in the shade. The result is better-conditioned, unstressed cows, which continue to produce well. Summer pasture recovers better because cows have not "milled", so production increases.

Having the ability to look after the pasture condition will increase the farm yield significantly.

While animals are in the shelter all animal produced waste matter (dung and urine) drops into the basement where it consolidates for easy removal at a convenient time of the year. The more the shelter is used the less nitrates there is on the land to leach. Hence prolonged stand-off (using the structure that can facilitate a reduction in adverse effects on animals that are standing off) has benefits to pasture and the environment.

Animals that feel comfortable due to the environment they ate in, can become quiet allowing trouble-free stock handling.

Environmental mastitis may decrease dramatically due to stock being less exposed to muddy, wet pasture conditions.

Cow's hooves are given a chance to dry out and stones that would normally be carried onto a feed pad drop through the slates of the floor. This, combined with the calming effect of warm relaxed cows, can result in a large reduction in herd lameness.

The shelter can provide a comfortable environment if ambient conditions are not so. For example, calving cows are not stressed in the wet and cold; new born calves are not exposed to harsh environment. The unique flooring system reduces the chance of infection by reducing the propensity for disease to manifest.

The shelters can, amongst other purposes serve as:
a place for loafing
shelter from heat and cold
a calving pad
a feed pad
a means to offer predictable production.

Dung and urine can drop into basement through the floor. During appropriate environmental conditions when ambient temperatures are sufficiently high the waste matter in the basement dehydrates and converts into a valuable nutrient-rich fertiliser ready for removal and spreading at a suitable time of the year.

When temperatures are lower dehydration may be slower or non-existent. At such times the basement acts primarily as a storage facility for waste matter. Here it is stored until environmental conditions change sufficiently for it to have dehydrated to a desired extent The dehydrated material, which contains valuable nutrients, can be stored in the basement and removed at such times as conditions are right for it to be spread on the farm as fertiliser.

Given that hose-down is not needed for cleaning the floor of the shelter the dehydration of waste material in the basement is not disrupted by hose-down water. Waste matter handling and pumping equipment can be eliminated or reduced thereby saving time and money.

Aspects of the present invention have been described by way of example only and it should be appreciated that modifications and additions may be made thereto without departing from the scope thereof.

The invention claimed is:

1. An at least partially open sided outdoor animal shelter structure, said structure comprising
   (a) a floor to support animals, said floor including apertures therethrough allowing animal waste matter to pass through the floor,
   (b) a basement below said floor for collecting said waste matter,
   (c) floor supports to support said floor above said basement,
   (d) side supports,
   (e) a water impervious canopy supported by said side supports, said canopy being supported above at least part of said floor, said canopy having an apex, said canopy allowing at least some light to pass therethrough,
   (f) at least one air flow controller to control ambient environmental conditions air flow in the area below said canopy, said air flow controller including a louvre board and said canopy, and extending outwardly and downwardly along one or more sides of the structure to direct air flow incoming to the area below the canopy along at least part of an underside of the canopy,
   said air flow controller including at least one closable opening in the canopy,
   said closable opening being positioned along at least part of the apex of said canopy, the closable opening being closable by a panel that is pivotally supported to move relative said canopy between a position closing said opening and a position to allow airflow through said opening,
   the floor being supported above the basement and the floor including a plurality of apertures to allow waste matter to drop through the floor and into the basement,
   the floor being elevated above at least some ground adjacent to where the structure is positioned to define an opening via which part of any appropriately directed ambient environmental conditions airflow incident on the structure to pass into the basement,
   on at least one side of the structure, the basement including an opening directly exposed to ambient atmospheric conditions to allow part of any appropriately directed ambient environmental conditions airflow to enter the basement.

2. The structure as claimed in claim 1, wherein said canopy is curved.

3. The structure as claimed in claim 1, that include a retractable shade cloth that is extended to be positioned above at least part of the floor and below said canopy to shade at least part of the floor from sunlight entering the structure.

4. The structure as claimed in claim 1, that include a removable shade cloth that is positioned above at least part of the floor and below said canopy to shade at least part of the floor from sunlight entering the structure.

5. An outdoor animal shelter structure comprising
(a) a floor to support animals,
(b) a canopy, supported above said floor, for animals to stand under, said canopy providing at least partial shading from ambient sunlight and cover from precipitation for at least part of said floor, wherein the space between the floor and the canopy is along at least part of one side of the structure continuously open to ambient atmospheric conditions, said canopy having an apex, and
(c) an air flow controller to control air flow in the space between the canopy and the floor, said air flow controller comprising at least a louvre board located adjacent at least one edge of the canopy yet separated therefrom to define a gap between the canopy and the louvre board, said louvre board oriented to direct part of any appropriately directed ambient environmental conditions air flow incident on the structure, through said gap and along at least part of the underside of said canopy to encourage a circulation of air in said space, and a closable opening through said canopy that, in its open condition, allows air flow out of the space, through said canopy,
said closable opening being positioned along at least part of the apex of said canopy, the closable opening being closable by a panel that is pivotally supported to move relative said canopy between a position closing said opening and a position to allow airflow through said opening,
the floor being supported above a basement and the floor including a plurality of apertures to allow waste matter to drop through the floor and into the basement, the floor being elevated above at least some ground adjacent to where the structure is positioned to define an opening via which part of any appropriately directed ambient environmental conditions airflow incident on the structure to pass into the basement,
on at least one side of the structure, the basement including an opening directly exposed to ambient atmospheric conditions to allow part of any appropriately directed ambient environmental conditions airflow to enter the basement.

6. The structure as claimed in claim 5, wherein the structure is four sided in plan shape and at least two of the sides are at least partially open to ambient atmospheric conditions and wherein said louvre board is provided at or near each of said open sides.

7. The structure as claimed in claim 6, wherein the canopy is varied in height above said floor and wherein the lower most parts of the canopy are disposed proximate said two opposed sides of said structure and at least one apex of the canopy is positioned intermediate thereof.

8. The structure as claimed in claim 7, wherein the canopy extends upwardly from each of said two opposed sides toward the apex.

9. The structure as claimed in claim 5, wherein the louvre board projects away from said space in a downward direction in order to encourage said ambient airflow said space in an upward direction.

10. The structure as claimed in claim 5, wherein said canopy is uni-directionally curved and defines an elongate apex extending intermediate of two opposed sides of said structure.

11. The structure as claimed in claim 5 wherein the air flow controller is provided to alter airflow through said opening to said basement.

12. The structure as claimed in claim 11 wherein said air flow controller is a movable baffle.

13. The structure as claimed in claim 12 wherein said baffle can be positioned to scoop airflow towards said opening.

14. The structure as claimed in claim 12 wherein said baffle can be positioned to constrict airflow through said opening.

* * * * *

UNITED STATES PATENT AND TRADEMARK OFFICE
CERTIFICATE OF CORRECTION

PATENT NO. : 8,490,579 B2  
APPLICATION NO. : 12/086415  
DATED : July 23, 2013  
INVENTOR(S) : Pow et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this
Eighth Day of September, 2015

Michelle K. Lee
*Director of the United States Patent and Trademark Office*